(12) United States Patent
Hurley et al.

(10) Patent No.: US 9,690,068 B2
(45) Date of Patent: Jun. 27, 2017

(54) OPTICAL FIBER CABLE AND ASSEMBLY

(71) Applicant: Corning Optical Communications LLC, Hickory, NC (US)

(72) Inventors: William Carl Hurley, Hickory, NC (US); William Welch McCollough, Lincolnton, NC (US); Mark Tracy Paap, Hickory, NC (US); Terry Lee Ellis, Hickory, NC (US); William Eric Caldwell, Hickory, NC (US); Rebecca Elizabeth Sistare, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 15/190,830

(22) Filed: Jun. 23, 2016

(65) Prior Publication Data

US 2017/0003468 A1    Jan. 5, 2017

Related U.S. Application Data

(60) Provisional application No. 62/186,497, filed on Jun. 30, 2015.

(51) Int. Cl.
*G02B 6/36* (2006.01)
*G02B 6/44* (2006.01)
*G02B 6/38* (2006.01)

(52) U.S. Cl.
CPC ......... *G02B 6/4472* (2013.01); *G02B 6/3821* (2013.01); *G02B 6/3887* (2013.01);
(Continued)

(58) Field of Classification Search
CPC ..... G02B 6/441; G02B 6/4471; G02B 6/4472
See application file for complete search history.

(56) References Cited

U.S. PATENT DOCUMENTS

| 4,893,893 A | 1/1990 | Claxton et al. |
|---|---|---|
| 8,380,029 B2 | 2/2013 | Cline et al. |
| (Continued) | | |

OTHER PUBLICATIONS

International Search Report and Written Opinion PCT/US2016/036800 Dated Dec. 23, 2016.
(Continued)

*Primary Examiner* — Rhonda Peace
(74) *Attorney, Agent, or Firm* — William D. Doyle (57) ABSTRACT

An optical cable assembly is provided. The cable assembly includes a plurality of subunits surrounded by an outer cable jacket, a furcation unit and optical connectors coupled to the end of each of the subunits. Each of the subunits includes an inner jacket, a plurality of optical fibers; and a tensile strength element. The first tensile strength element and the inner jackets of each subunits are coupled to the furcation unit, and the optical fibers and tensile strength elements of each subunit extend through the furcation unit without being coupled to the furcation unit. The subunit tensile strength element and optical fibers of each subunit are balanced such that both experience axial loading applied to the assembly and, under various loading conditions, the compression of the subunits is controlled and/or the axial loading of the optical fibers is limited to allow proper function of the optical connector.

20 Claims, 4 Drawing Sheets

(52) U.S. Cl.
CPC ............. *G02B 6/441* (2013.01); *G02B 6/443* (2013.01); *G02B 6/4434* (2013.01); *G02B 6/4471* (2013.01); *G02B 6/4477* (2013.01)

(56) References Cited

U.S. PATENT DOCUMENTS

| | | | |
|---|---|---|---|
| 8,718,428 B2* | 5/2014 | Hurley | G02B 6/4411 |
| | | | 264/1.28 |
| 8,737,786 B1 | 5/2014 | Compton et al. | |
| 8,855,455 B2* | 10/2014 | Keller | G02B 6/441 |
| | | | 385/110 |
| 8,953,916 B2 | 2/2015 | Hurley et al. | |
| 9,097,869 B2* | 8/2015 | Hurley | G02B 6/4411 |
| 9,285,556 B2* | 3/2016 | Burris | G02B 6/4415 |
| 9,405,084 B2* | 8/2016 | Hurley | G02B 6/4472 |
| 9,529,172 B2* | 12/2016 | Baker | G02B 6/28 |
| 2014/0140662 A1 | 5/2014 | McDonald et al. | |
| 2014/0241676 A1 | 8/2014 | Smith | |
| 2014/0369648 A1 | 12/2014 | Nielson | |
| 2015/0010283 A1 | 1/2015 | Hurley et al. | |
| 2017/0003468 A1* | 1/2017 | Hurley | G02B 6/4472 |

OTHER PUBLICATIONS

U.S. Appl. No. 62/035,016, filed Aug. 8, 2014, "Optical Fiber Cable," C. Guenter, H. Hudson, II, W. Hurley.
Yates, W.A.; Hurley, W.C., "Development of Cable and Connectivity Solutions," Proceedings of the 60th IWCS, 2011, pp. 212-221.

* cited by examiner

OPTICAL FIBER CABLE AND ASSEMBLY

CROSS-REFERENCE TO RELATED APPLICATIONS

This application claims the benefit of priority to U.S. Provisional Application No. 62/186,497, filed on Jun. 30, 2015, and is incorporated herein by reference.

BACKGROUND

The disclosure relates generally to optical communication cables and more particularly to optical communication cable assemblies that include multiple optical fiber subunits. Optical communication cables have seen increased use in a wide variety of electronics and telecommunications fields. Optical communication cables contain or surround one or more optical communication fibers. The cable provides structure and protection for the optical fibers within the cable.

SUMMARY

One embodiment of the disclosure relates to an optical communication cable assembly including an outer cable jacket and a first tensile strength element surrounded by the outer cable jacket. The optical communication cable assembly also includes a plurality of optical transmission units surrounded by the outer cable jacket. Each optical transmission unit includes an inner jacket defining a passage, a plurality of elongate optical transmission elements located within the passage and a second tensile strength element located within the passage. The optical communication cable assembly includes a furcation unit, and the first tensile strength element and the inner jackets of each optical transmission units are coupled to the furcation unit. The plurality of elongate optical transmission elements and the second tensile strength element extend through the furcation unit without being coupled to the furcation unit. The optical communication cable assembly also includes an optical connector coupled to an end of each of the plurality of optical transmission units. Each optical connector includes a body coupled to the second tensile strength element of the optical transmission unit, a ferule coupled to the elongate optical transmission elements of the optical transmission unit and a spring located between the ferule and the body. The spring has a spring force representative of the force needed to cause a maximum allowed compression of the spring. The first tensile strength element is located outside of the inner jackets of the optical transmission units. The cable assembly has a maximum rated cable load and at the maximum rated cable load, the sum of axial forces experienced by the elongate optical transmission elements within each one of the optical transmission units is greater than 0.5 N and is less than the spring force.

An additional embodiment of the disclosure relates to an optical communication cable assembly including an outer cable jacket, a first tensile strength element surrounded by the outer cable jacket and a plurality of subunits surrounded by the outer cable jacket. Each subunit includes an inner jacket defining a passage, a plurality of optical fibers located within the passage that together have an axial rigidity and a second tensile strength element located within the passage that has an axial rigidity. The optical communication cable assembly includes a coupling unit, and the outer cable jacket is received within a first end of the coupling unit such that the outer cable jacket terminates at the coupling unit. Each of the subunits extends out of a second end of the coupling unit. The first tensile strength element and the inner jackets of each of the subunits are coupled to the coupling unit, and the plurality of optical fibers and the second tensile strength element extend through the coupling unit without being coupled to the coupling unit. The optical communication cable assembly includes an optical connector coupled to an end of each of the subunits. Each optical connector includes a body coupled to the second tensile strength element of the subunit, a ferule coupled to all of the optical fibers of the subunit and a spring located between the ferule and the body. The spring has a spring force representative of the force needed to cause a maximum compression of the spring. The first tensile strength element is located outside of the inner jackets of the subunits. Each subunit has a subunit end portion located between the coupling unit and the optical connector coupled to the subunit, and the subunit end portion has an initial length measured between the coupling unit and the optical connector. Under axial loading of the cable assembly applied at the coupling unit, each subunit experiences a portion of the axial load resulting in compression of the subunit end portion, and both the optical fibers and the second tensile strength element experience some of the portion of the axial loading of the subunit. A ratio of the axial rigidity of the second tensile strength element to the axial rigidity of the optical fibers of each subunit is such that, when a decrease in length of the subunit end portion under the axial loading is between 0.1% and 2.5%, the portion of the axial load experienced by the optical fibers of the subunit is greater than zero and is less than the spring force.

An additional embodiment of the disclosure relates to an optical communication cable assembly including an outer cable jacket, a first tensile strength element surrounded by the outer cable jacket that has an axial rigidity and a plurality of subunits surrounded by the outer cable jacket. Each subunit includes an inner jacket defining a passage, a plurality of optical fibers located within the passage and a second tensile strength element located within the passage. Each subunit has an axial rigidity. The optical communication cable assembly includes a furcation unit. The first tensile strength element and the inner jackets of each subunit are coupled to the furcation unit, and the plurality of optical fibers and the second tensile strength element of each subunit extend through the furcation unit without being coupled to the furcation unit. The optical communication cable assembly includes an optical connector coupled to an end of each of the subunits. Each optical connector including a body coupled to the second tensile strength element of the subunit, and a ferule coupled to all of the optical fibers of the subunit. The cable assembly has a maximum rated cable load and a total axial rigidity that is the sum of the axial rigidities of all of the optical fibers of all of the subunits, of the second strength elements of all of the subunits and of the first tensile strength element. Under axial loading applied at the furcation unit, each subunit experiences a portion of the axial load that causes compression of a portion of the subunit located between the furcation unit and the optical connector. The compression is relative to the amount of axial loading, and both the optical fibers and the second tensile strength element experience some of the portion of the axial loading of the subunit. A ratio of the axial rigidity of the subunits to the total axial rigidity of the cable assembly is such that compression of each subunit is between 0.1% and 2.5% of an initial length of the portion of the subunit between the furcation unit and the optical connector at the maximum rated cable load.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of an optical communication cable assembly are shown. In general, the cable assembly discussed herein is configured to balance or distribute axial loading of the cable assembly between the optical fibers and strength elements in way that balances several performance parameters of the fiber optic cable assembly. In general, the cable assembly discussed herein allows both the tensile strength members and the optical fibers of the cable subunits to experience some portion of the total axial load applied to the cable assembly while at the same time providing the desired optical transmission characteristics at the optical connectors and/or limiting over compression of the furcation leg portions of the subunits under axial loading. As used herein, the furcation leg generally is the portion of optical fiber subunits located between the furcation unit and the optical connector.

In addition, the cable assemblies discussed herein are configured to provide an indication that the axial load on the cable assembly has exceeded the permitted axial load before the axial load reaches the level that would cause transmission problems at the optical connector. In various embodiments, the cable assembly discussed herein provides these advantages while providing a cable design that reduces the amount of excess optical fiber length ("EFL") needed within the cable, and thus, reduces the amount of optical fiber needed for a particular assembly. In various embodiments, the decrease in EFL allows the cable assemblies discussed herein to have a reduced outer cable diameter as compared to other conventional cable assemblies having the same total number of optical fibers.

In general, the cable assembly discussed herein includes an optical cable that has an outer cable jacket surrounding first or outer tensile strength elements(s) and a plurality of optical fiber subunits. The optical fiber subunits each include a jacket surrounding a plurality of elongate optical transmission elements (e.g., optical fibers) and a second or inner tensile strength element. At a furcation unit, the outer cable jacket and first tensile strength elements are coupled to the furcation unit, and the subunits extend through the furcation unit to be connectorized downstream of the furcation unit. In various embodiments, the inner jackets of the subunit are coupled to the furcation unit, but the optical fibers of the subunit and the inner strength elements pass through the furcation unit without being bonded to the furcation unit. By avoiding bonding of the optical fibers and inner strength elements to the furcation unit, the need to open each subunit within the furcation unit is avoided.

However, this type of furcation unit coupling also exposes the subunit furcation legs to axial loading applied to the cable assembly (e.g., axial loading applied to the furcation unit). To address the furcation leg loading, the optical fibers and inner tensile strength members within the subunits are balanced to provide various load distribution characteristics as discussed herein. For example, in various embodiments, the lengths of the optical fibers within a subunit are substantially the same (e.g., length difference of less than 0.05%) as the length of the inner tensile strength members. In this arrangement, when the cable assembly is exposed to axial loading, both the inner tensile strength elements and the optical fibers of the subunit experience some of the axial loading. This is in contrast to many conventional cable assembly designs that either use fiber lock down at the furcation unit to isolate the optical fibers within the furcation legs from axial loading or that use excess optical fiber length to ensure that all of the axial load is born by the inner tensile strength elements.

As explained in more detail below, the cable assembly design discussed herein balances the size, number and/or axial rigidity of the inner tensile strength members and of the optical fibers of each subunit such that axial loading of the cable is distributed between these two cable components in a manner that both limits/prevents over compression of the furcation legs and also limits/prevents load-based optical connector failure at maximum rated cable loading. Further, the cable assembly design discussed herein balances the size, number and/or axial rigidity of the inner tensile strength members and of the optical fibers of each subunit such that over compression of the furcation legs (which can be visibly detected by an installer, for example) occurs before load-based optical connector failure as a way of providing an easily visible indication that the cable assembly is experiencing too much axial loading. This is believed to provide an advantage because it is relatively difficult to determine if an optical connector is experiencing tension based failure and typically requires measuring optical transmission through the connector. Accordingly, the cable assembly design discussed herein provides an advantage allowing the installer to easily determine that the cable assembly is experiencing too much axial loading by visually seeing the over compression of the furcation leg before the axial loading gets high enough that a good optical connection within the optical connector cannot be maintained. Other specific cable assembly structures, functions and advantages are discussed herein.

Figure 1:
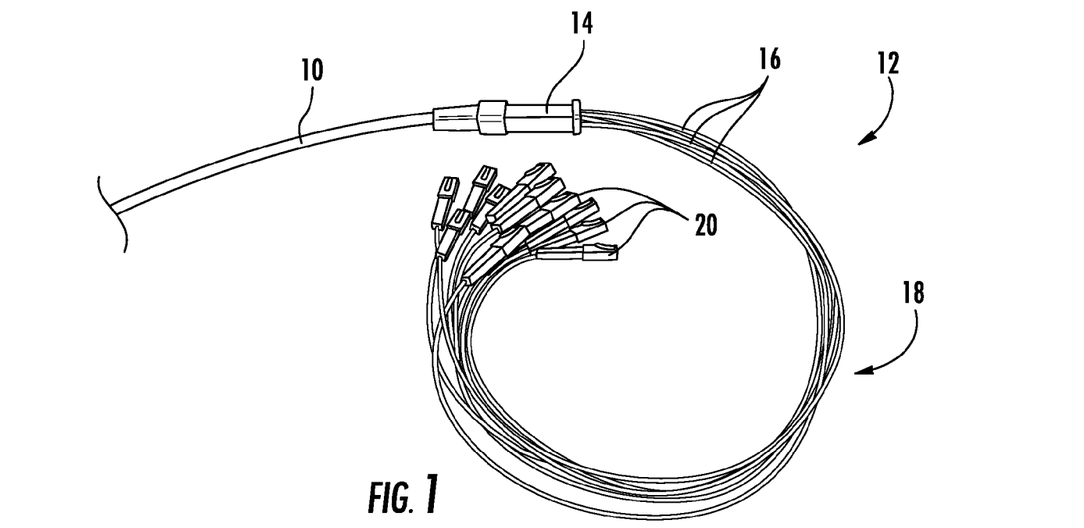
FIG. 1 is a perspective view of an optical fiber cable assembly in accordance with aspects of the present disclosure.

Referring to FIG. 1, an optical communication cable, shown as cable 10, is shown following furcation and connectorization, forming an optical communication cable assembly, shown as cable assembly 12. Cable assembly 12 includes a coupling unit, shown as furcation unit 14. In general, furcation unit 14 is mounted or coupled to cable 10 allowing optical fibers held within optical transmission units, shown as subunits 16, to be accessed for connectorization and coupling to equipment. Specifically, cable 10 is received into furcation unit 14, and one or more component of cable 10 is coupled to furcation unit 14. As will be explained in more detail below, at furcation unit 14 a downstream or end portion of the outer jacket of cable 10 is removed, and fiber optic subunits 16 extend through and out of furcation unit 14 forming furcation legs 18. In general, furcation legs 18 are the end portions of subunits 16 that are located between the furcation unit 14 and connectors 20. As explained in more detail below regarding FIG. 5, optical connectors, shown as fiber optic connectors 20, are coupled to the downstream ends of subunits 16. In general, each fiber optic connector 20 is coupled to all of the optical fibers of the particular subunit 16 to which it is attached, and connector 20 facilitates connection of the optical fibers to the various datacenter equipment or to other optical fiber cables that cable 10 services.

It should be understood that, as used herein, a furcation leg is the portion of subunit 16 that extends from furcation unit 14 that terminates in a fiber optic connector 20. In some such embodiments, cable assembly 12 utilizes each subunit 16 and its corresponding jacket as the furcation leg. Thus, in some such embodiments, separate furcation tubes do not need to be installed to support optical fibers of the subunits because the jacket of each subunit is sufficiently robust to provide for protection of optical fibers of the subunit following removal of the outer cable jacket of cable 10. In addition, in such embodiments, the jackets of the subunits 16 are sufficiently robust to support coupling of connectors 20.

Figure 2:
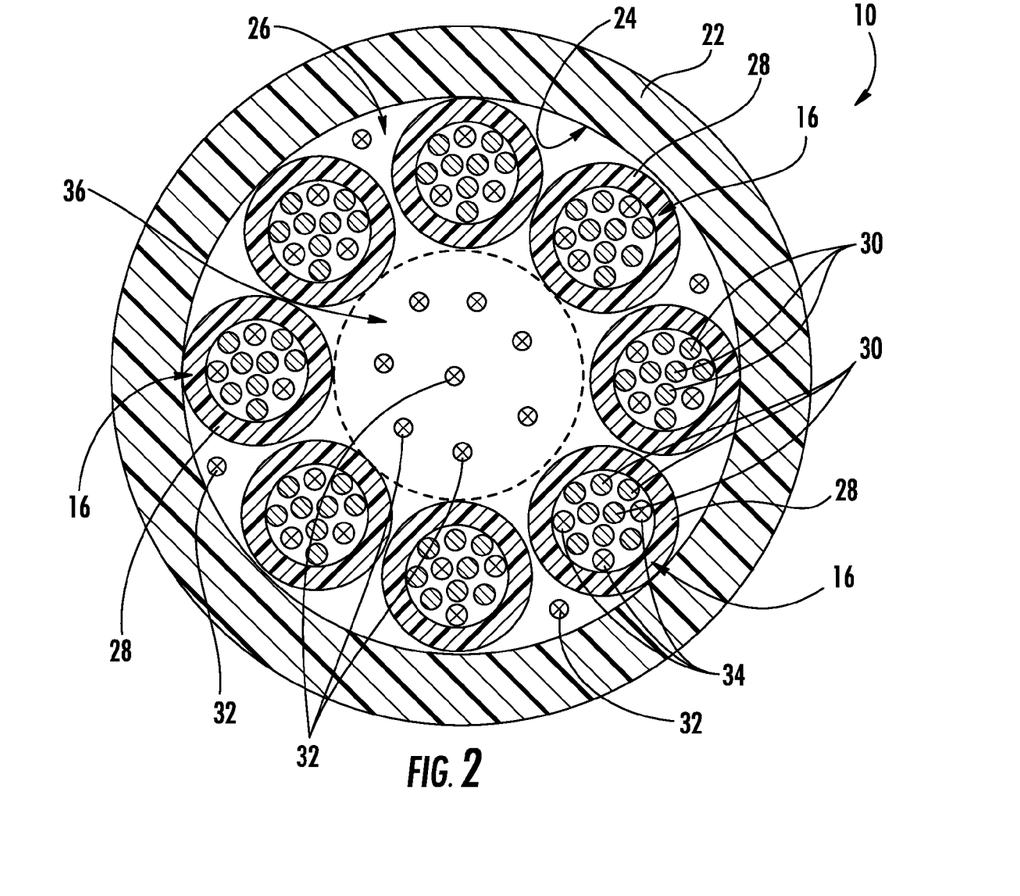
FIG. 2 is a cross-sectional view of the cable shown in FIG. 1 in accordance with aspects of the present disclosure.

Referring to FIG. 2, a cross-sectional view of cable 10 is shown taken perpendicular to the longitudinal axis of cable 10 at a location upstream from furcation unit 14. Cable 10 includes an outer cable layer or jacket, shown as a cable body or cable jacket 22, having an inner surface 24 that defines an inner passage or cavity, shown as central bore 26. As will be generally understood, inner surface 24 of jacket 22 defines an internal area or region within which the various cable components discussed below are located.

Figure 3:
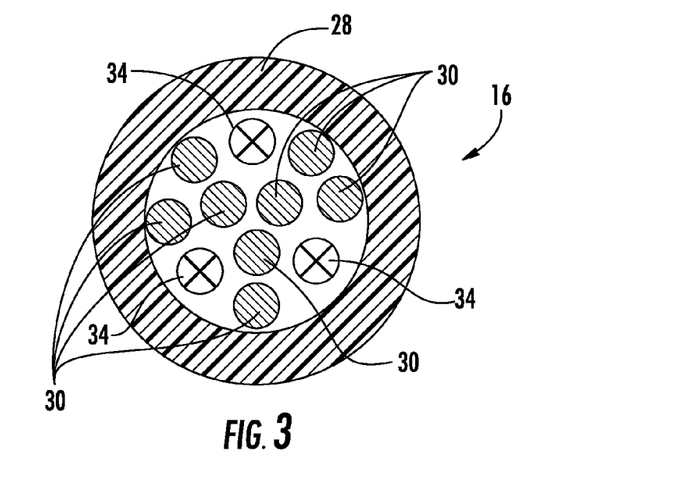
FIG. 3 is a detailed cross-sectional view of a subunit of the cable shown in FIG. 1 in accordance with aspects of the present disclosure.

As noted above, cable 10 includes a plurality of subunits 16 that are located within central bore 26 and surrounded by cable jacket 22. As shown in FIG. 3, each subunit 16 includes an inner jacket, shown as subunit sheath 28, that defines a passage within each sheath. Each subunit 16 includes a plurality of optical transmission elements, shown as optical fibers 30 located within sheath 28. In various embodiments, each subunit 16 can include various numbers of optical fibers, and in specific embodiments may include eight or twelve optical fibers. Similarly, cable 10 may include various numbers of subunits 16 to provide the desired number of optical fibers within the cable as a whole. In various embodiments, cable 10 may include 2, 4, 6, 8, 10, 12, 24, 48, etc. subunits 16. In a specific embodiment, cable 10 includes at least three subunits 16 and each subunit includes at least eight optical fibers 30. In another embodiment, cable 10 includes 96 or fewer optical fibers 30 distributed between 12 or fewer subunits 16.

Cable 10 also includes a plurality of tensile strength elements. In particular, cable 10 includes one or more first tensile strength element, shown as outer strength yarn 32, and each subunit 16 includes one or more second tensile strength element, shown as inner strength yarn 34, located within subunit sheath 28. As explained in more detail below, outer strength yarn 32 is coupled to furcation unit 14, and inner strength yarn 34 of each subunit is coupled to the connector 20 associated with a particular subunit to provide the load distribution properties discussed herein.

In various embodiments, inner strength yarn 34 and optical fibers 30 within each subunit 16 have a substantially equal length (e.g., lengths within 0.05% of each other). In this arrangement, and contrary to many cable designs, axial loading of cable 10 at furcation unit 14 is experienced by both inner strength yarn 34 and optical fibers 30, but the size, number, and/or axial rigidity of inner strength yarn 34 and optical fibers 30 are balanced within each subunit 16 to limit or prevent compression failure of the furcation leg and compression failure of the optical connector 20. In various embodiments, outer strength yarn 32 and/or inner strength yarn 34 may be a suitable elongate tensile strength member, and in specific embodiments, outer strength yarn 32 and/or inner strength yarn 34 may be aramid strength yarn. In other embodiments, outer strength yarn 32 and/or inner strength yarn 34 may be any suitable tensile strength material such as fiberglass yarn, poly(p-phenylene-2,6-benzobisoxazole) yarn sold under the trade Zylon, polyester-polyarylate liquid crystal polymer fiber sold under the trade name Vectran, or other high strength tensile yarns.

Cable 10 may include a central group 36 of outer strength yarn 32, and subunits may be positioned to circumferentially surround central group 36 in one or more layers of subunits 16. In various embodiments, subunits 16 are arranged in a wrapped pattern, such as an SZ stranding pattern or a helical pattern, around strength yarn central group 36. Cable 10 may also include one or more additional outer strength yarn 32 positioned radially exterior to strength yarn central group 36. In other embodiments, cable 10 may include other strength elements such as a glass-reinforced plastic rod (GRP) or metal wire.

As discussed in more detail below, cable 10 has a maximum rated cable load which is the maximum axial load (e.g., axial load applied to furcation unit 14) that cable 10 will bear while still providing satisfactory performance. In various embodiments, the maximum rated cable load of cable 10 is defined in industry standards, ICEA s-83-596-2011, titled Standards for Indoor Optical Fiber Cables, and/or GR-409 CORE, titled Generic Requirements for Premises Fiber Optical Cable, and may be determined by the Fiber Optic Test Procedures referenced therein. In various embodiments, cable 10 has a maximum rated cable load between 50 lbs. and 350 lbs. In specific embodiments, cable 10 has maximum rated cable loads of 300 lbs., 150 lbs. or 100 lbs. or any other cable load that may be specified.

Figure 4:
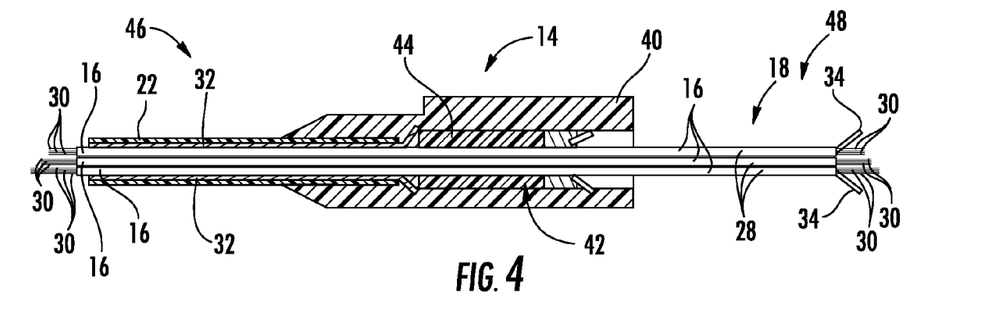
FIG. 4 is a side cross-sectional view of the furcation unit shown in FIG. 1 in accordance with aspects of the present disclosure.

Referring to FIG. 4, a cross-sectional view of furcation unit 14 is shown. In general, furcation unit 14 includes an outer body or shell 40 that defines a central channel 42. To couple furcation unit 14 to cable 10, a portion of cable jacket 22 is removed exposing subunits 16, and subunits 16 extend through and out of furcation unit 14. A coupling agent 44 is positioned within central channel 42 such that outer strength yarn 32 and the outer surfaces of subunit sheaths 28 are coupled together to furcation unit 14. Coupling agent 44 may be any suitable adhesive material including epoxy or RTV adhesive. In this embodiment, subunit sheaths 28 are left intact such that optical fibers 30 and inner tensile strength yarn 32 are not coupled together with furcation unit 14 allowing these components to extend through furcation unit 14 toward optical connectors 20 uncoupled to furcation unit 14. In this arrangement, on the upstream side 46 of furcation unit 14, cable 10 is intact such that the outer surface of jacket 22 defines the outer surface of the cable assembly on upstream side 46. On the downstream side 48 of furcation plug 14, cable jacket 22 has been removed exposing each subunit 16. In this arrangement, because subunit sheaths 28 are left intact such that subunits 16 extend through furcation unit 14, the outer surfaces of subunit sheaths 28 define the outer surfaces of cable assembly 12 on downstream side 48 of furcation unit 14.

Figure 5:
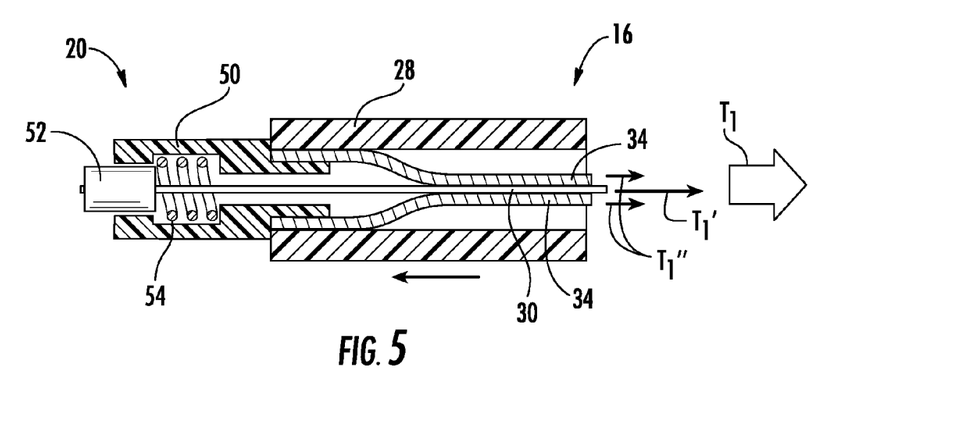
FIG. 5 is a side cross-sectional view of one of the optical connectors shown in FIG. 1 in accordance with aspects of the present disclosure.

Referring to FIG. 5, a schematic cross-section view of one of optical connectors 20 located at the downstream end of one of subunits 16 is shown according to an exemplary embodiment. Optical connector 20 includes a connector body 50, a ferule 52 and a spring 54. Connector body 50 is received at least partially within subunit sheath 28, and inner strength yarn 34 are coupled (e.g., with a crimp band, with an epoxy or other adhesive) to connector body 50. The subunit's optical fibers 30 (schematically represented as a single fiber 30 in FIG. 5) are all connected to ferrule 52.

Ferrule 52 is a structure that supports the end of optical fibers 30 for making an optical connection with another optical device or optical fiber cable. In such connections, a polished downstream face of optical fiber 30 is surrounded by ferrule 52 and abuts the face of a downstream optical fiber or device. As will be understood, in order for the connection at ferrule 52 to function properly, the amount of pressure between the opposing faces of optical fibers 30 and the downstream fibers is kept within a precisely controlled range. To facilitate control of this connection, connector 20 includes spring 54 located between ferrule 52 and body 50. In general, spring 54 provides a force to maintain the desired pressure range at the interface between optical fibers 30 and the downstream fibers, even though the axial load, represented by $T_1$, experienced by subunit 16 varies as varying axial loads are applied to cable assembly 12.

The pressure provided by spring 54 can be described based on the spring force of spring 54. As used herein, the spring force of spring 54 is amount of force needed to cause the maximum allowed compression of spring 54 that still permits ferrule 52 to make the desired optical connection with the downstream optical fiber. If the axial load on the optical fibers exceeds this maximum allowed spring force, the transmission of the optical signal from optical fibers 30 to the downstream fibers through connectors 20 falls below the satisfactory transmission limits. In various embodiments, the spring force of spring 54 is greater than 5 newtons (N), and in specific embodiments, is between 7 N and 10 N, and more specifically is between 8 N and 9.8 N.

In various embodiments, because the cable assembly arrangement discussed herein allows optical fibers 30 to experience some of the axial loading experienced by cable assembly 12, subunits 16 are structured to limit or prevent the axial load experienced by optical fibers 30 from exceeding the spring force of spring 54. Thus, subunits 16 are structured to limit or prevent failure of connector 20 by the over-compression of spring 54. As an example, FIG. 5 shows the total axial load experienced by a particular subunit 16, as $T_1$. Because the axial load $T_1$ is borne by both optical fibers 30 and inner tensile strength elements 34, $T_1$ is distributed between both subunit component types, such that optical fibers 30 experience $T_1'$ (which is a fraction of $T_1$), and inner tensile strength elements 34 experience $T_1''$ (which is the remaining fraction of $T_1$).

In various embodiments, the two primary load bearing components of each subunit, optical fibers 30 and inner tensile strength elements 34, have sizes, numbers and/or material properties such that when cable assembly 12 experiences its maximum rated cable load, the total sum of axial forces experienced by all optical fibers 30 within a subunit 16, $T_1'$, is greater than zero but is less than the spring force of spring 54. This ensures that at the maximum rated cable load, compression based failure of optical connectors 20 does not occur. In a specific embodiment, optical fibers 30 and inner tensile strength elements 34 within each subunit 16 have sizes, numbers and/or material properties such that when cable assembly 12 experiences its maximum rated cable load, the total sum of axial forces experienced by all optical fibers 30 within a subunit 16, $T_1'$, is greater than 0.5 N but is less than the spring force of spring 54. Thus, in the cable assembly designs discussed herein, optical fibers 30 and inner tensile strength yarn 34 are balanced such that optical connector 20 maintains the desired optical connection at the maximum rated cable load while also allowing optical fibers 30 to experience a portion of axial loading experienced by cable assembly 12.

Figure 6:
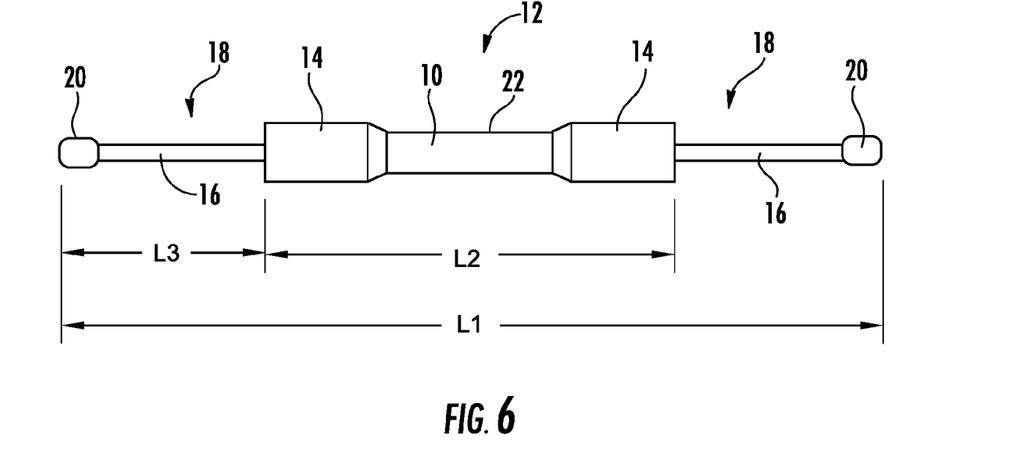
FIG. 6 is a schematic side view of the cable assembly of FIG. 1 prior to axial loading in accordance with aspects of the present disclosure.
Figure 7:
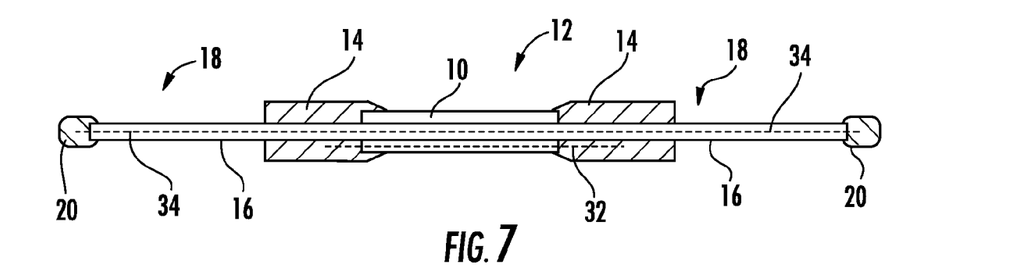
FIG. 7 is a schematic side cross-sectional view of the cable assembly of FIG. 1 prior to axial loading in accordance with aspects of the present disclosure.
Figure 8:
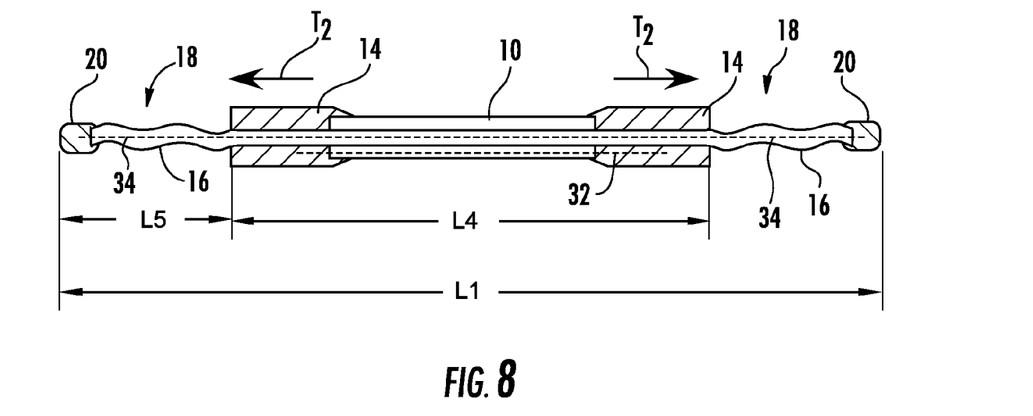
FIG. 8 is a schematic side cross-sectional view of the cable assembly of FIG. 1 under axial loading in accordance with aspects of the present disclosure.

Referring to FIGS. 6-8, in addition to limiting or preventing compression of spring 54, cable assembly 12 and subunits 16 discussed herein are configured to limit the amount of compression experienced by the portion of subunits 16 forming furcation legs 18. FIG. 6 shows a schematic view of cable assembly 12 depicting both connectorized ends of the assembly. FIG. 7 shows a schematic side cross-sectional view of cable assembly 12. It should be understood that for clarity FIGS. 6-8 depict a single subunit 16 extending from furcation units 14. However, as discussed above, cable 10 includes a plurality of subunits 16 that are each configured as shown and described in FIGS. 6-8.

As shown schematically in FIG. 7, outer tensile strength member 32 is coupled at both ends to furcation units 14, and inner tensile strength member 34 is coupled at both ends to optical connector 20. As shown in FIG. 6, without axial loading, cable assembly 12 has a total length L1 measured between opposing optical connectors 20 located at opposite ends of one of the subunits 16. Cable 10 and furcation units 14 have a total length, L2, measured between opposing faces of furcation units 14, and each furcation leg 18 has a length, L3, measured between the end of the optical connector 20 and furcation unit 14.

As shown in FIG. 8, as cable assembly 12 is loaded in the axial direction (e.g., axial loading applied to furcation unit 14), cable assembly 12 experiences loading, shown as $T_2$. As will be explained in more detail below $T_2$ is related to $T_1$ shown in FIG. 5, in that $T_1$ is the portion of $T_2$ that each subunit experiences when the cable assembly experiences loading, $T_2$. As shown in FIG. 8, under axial loading $T_2$, cable assembly 12 has a total length L1, cable 10 and furcation units 14 have a total length, L4, and each furcation leg 18 has a length, L5. Under this type of axial loading the total length, L1, remains unchanged. However, under axial loading $T_2$, cable 10 is stretched such that L4 is greater than L2, but conversely, subunits 16 are compressed (e.g., decrease in length), such that L5 is less than L3.

As shown in FIG. 8, if the compression of subunit 16 reaches a certain level, subunits 16 can develop a buckled or wavy appearance. The amount of axial force $T_2$, that cable assembly 12 must experience in order to generate the buckled appearance varies based the structure of a particular cable design (e.g., subunit sheath thickness, number of optical fibers per connector, cable jacket thickness, total number optical fibers in the cable, the stranding pattern, the number of inner strength members, the number of outer strength members, material properties of the cable components, etc.). However, in general, the buckled appearance is related to the amount of compression of subunit 16 experiences under axial loading, represented by L3–L5, and is also related to the percent of compression of subunit 16 under axial loading, represented by (L3–L5)/L5*100.

Figure 9:
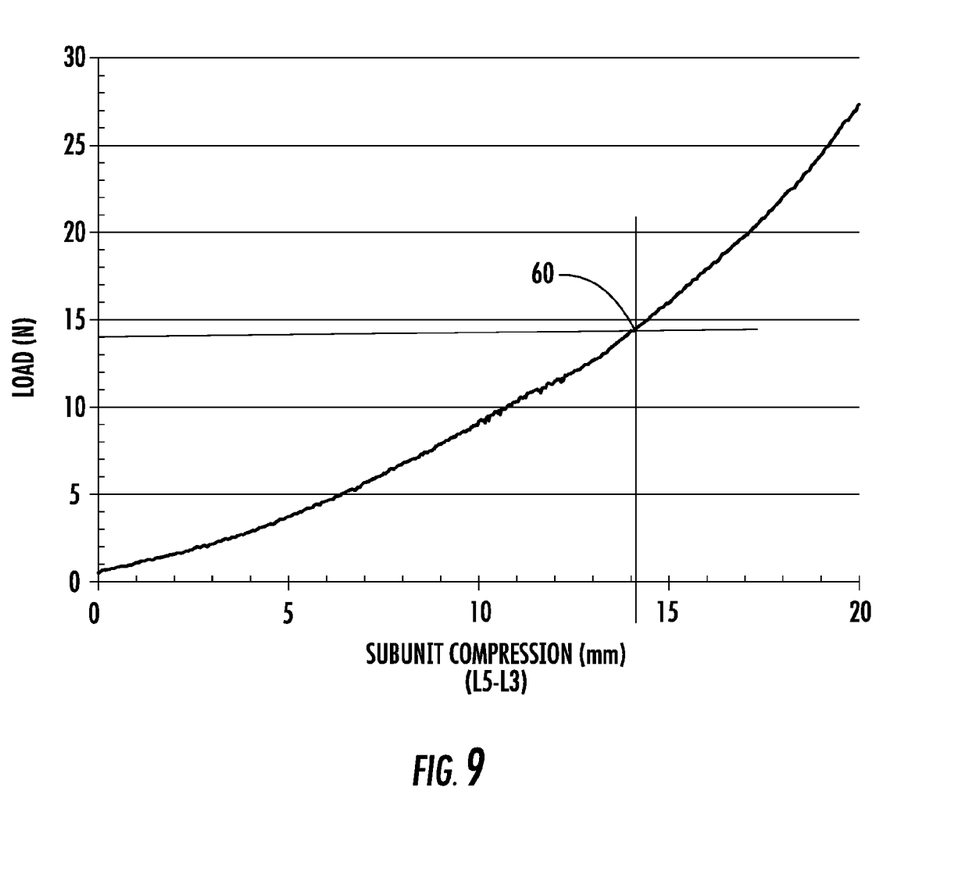
FIG. 9 is a graph showing a relation between subunit compression and axial loading in accordance with aspects of the present disclosure.

By way of example, FIG. 9, shows a graph of axial loading of a single subunit in newtons versus the compression of the subunit in millimeters. As shown compression of subunit 16 increases as axial loading increases. For the particular cable subunit shown in FIG. 9, the subunit buckled or appeared "wavy" at an axial load of 14 newtons shown at point 60. The subunit 16 tested in FIG. 9, included 12 optical fibers 30 and had a subunit sheath 28 with 2.0 mm outer diameter and a radial thickness of 0.3 mm. In various embodiments, the diameter of subunit sheath 28 is between 1.5 mm to 4.0 mm, and more specifically is between 1.7 mm to 3.3 mm. In various embodiments, the average radial wall thickness of subunit sheath 28 is between 0.2 mm 0.7 mm, and more specifically is between 0.3 mm to 0.6 mm.

In various embodiments, cable assembly 12 is configured such that subunit compression, shown as L3–L5, is kept within a predetermined threshold range when $T_2$ is equal to the maximum rated cable load. In various embodiments, cable assembly 12 is configured such that percentage subunit compression, shown as (L3–L5)/L5*100, is between 0.1% and 2.5% when $T_2$ is at the maximum rated cable load. In other embodiments, cable assembly 12 is configured such that subunit compression, shown as L3–L5, is between 1 mm and 15 mm when $T_2$ is at the maximum rated cable load. In various embodiments, by designing cable assembly to meet these subunit compression ranges, subunits 16 will not show the buckled appearance at the maximum rated cable load. In various embodiments, the number and type of optical fibers 30 and of inner tensile strength elements 34 within each subunit 16 are selected such that subunits 16 experience subunit compression within the ranges shown above when the cable assembly experiences the maximum rated cable load.

In various embodiments, cable assembly 12 is configured such that at the maximum rated cable load, both subunit compression is maintained within the compression ranges discussed herein and the tension, $T_1'$, experienced by optical fibers 30 remains below the spring force of spring 54 and/or within the spring force ranges discuss herein. In such embodiments, cable assembly 12 is configured such that at the maximum rated cable load, spring 54 does not exceed the maximum allowed compression and subunits 16 do not buckle.

In various embodiments, cable assembly 12 may be configured such that as axial loading, represented by $T_2$, increases, subunit compression reaches the threshold at which buckling of the subunit occurs (see FIG. 8) before spring 54 exceeds the maximum allowed spring compression. In such embodiments, the installer or user of cable assembly 12 will be able to visually detect the defective or overloaded cable assembly simply by viewing the buckled subunits. This allows the user to remove, replace or otherwise repair the overloaded cable assembly 12 based on observing the buckled subunits that indicate overloading without requiring testing of the optical connection at connector 20 (which cannot be performed visually).

While the tension balance between optical fibers 30 and inner tensile strength elements 34 will be different based on the physical properties of different cable assembly designs, Applicant has determined that subunit compression thresholds and spring compression limits discussed above can be achieved by building a cable assembly in which the axial rigidity of optical fibers 30 within a particular subunit 16 is balanced relative to the axial rigidity of the inner tensile strength elements 34 of a particular subunit 16, for a particular cable design. In various embodiments, the axial rigidity of optical fibers 30 is within a range of 6 kN to 11 kN and more specifically of 7.1 kN to 10.7 kN, and the axial rigidity of inner tensile strength elements 34 is within a range of 10 kN to 50 kN and more specifically of 12.5 kN to 49 kN.

In addition, the subunit compression thresholds and spring compression limits discussed above can also be achieved by balancing the axial rigidity of the subunits 16 relative to the total axial rigidity of the cable 10, for a particular cable design. In various embodiments, the axial rigidity of a subunit 16 is within a range of 16 kN to 61 kN, and the axial rigidity of cable 10 is within a range of 150 kN to 2000 kN.

SUBUNIT DESIGN EXAMPLES

In various embodiments, axial rigidity of the optical fibers 30 of a particular subunit is the product of the loading bearing cross-sectional area of all optical fibers 30 within a subunit ($A_{fiber}$) times the elastic modulus of the fiber material ($E_{fiber}$). Thus, axial rigidity of optical fibers 30 is given by the following equation:

$$\text{Fiber } EA = A_{fiber} * E_{fiber} \quad \text{Equation 1}$$

Similarly, axial rigidity of the inner tensile strength elements 34 of a particular subunit is the product of the loading bearing cross-sectional area of all inner tensile strength elements 34 within a subunit ($A_{se}$) times the elastic modulus of the strength element material ($E_{se}$). Thus, axial rigidity of inner tensile strength elements 34 is given by the following equation:

$$\text{Strength Element } EA = A_{se} * E_{se} \quad \text{Equation 2}$$

Because the primary load bearing elements of a subunit 16 are optical fibers 30 and inner tensile strength elements 34, the total axial rigidity of a subunit is given by the following equation:

$$\text{Subunit } EA = \text{Strength Element } EA + \text{Fiber } EA \quad \text{Equation 3}$$

As noted above, subunits 16 are configured such that at the maximum rated cable load and/or at the axial load generating the maximum allowed subunit compression, the axial load born by optical fibers 30 is less than the maximum allowed spring force of connector spring 54 (shown in FIG. 5). This relationship is shown by the following equation $$\frac{\text{Fiber } EA}{\text{Subunit } EA} * T_1 < \text{Connector Spring Force} \quad \text{Equation 4}$$

In Equation 4, $T_1$ is the total axial load experienced by the subunit 16, and in specific embodiments, $T_1$ may be the total axial load experienced by subunit 16 at the maximum rated cable load for cable assembly 12. In other embodiments, $T_1$ may be the total axial load experienced by subunit 16 at the cable assembly axial load, $T_2$, that generates the maximum allowed subunit compression. As discussed above, $T_1$ may be determined for a particular cable 10 or subunit 16 by direct testing, or may be determined from cable loading properties as discussed in more detail below.

By substituting Equation 3 into Equation 4, the amount Strength Element EA needed based a particular subunit axial load limits, represented by $T_1$, is given by the equation:

$$\text{Strength Element } EA > \left(\frac{T_s}{\text{Spring Force}} - 1\right) * \text{Fiber } EA \qquad \text{Equation 5}$$

Thus, the total number of inner strength elements 34 needed is determined using equation 5, based upon the known cross-sectional area and elastic modulus for the desired type and size of strength elements. As will be understood, cross-sectional area for an aramid fiber is derivable from the denier of the particular chosen fiber type and the elastic modulus of that fiber is typically between 70 GPa and 80 GPa for standard modulus aramid, and is typically between 100 GPa and 120 GPa for high modulus aramid. As shown below, Table 1 shows the minimum number and type of aramid yarn strands needed to satisfy equation 5 for four different subunit designs:

TABLE 1

|  | Subunit Design 1 | Subunit Design 2 | Subunit Design 3 | Subunit Design 4 |
| --- | --- | --- | --- | --- |
| Subunit OD (mm) | 2.0 | 2.0 | 3.0 | 3.0 |
| Subunit Wall Thickness (mm) | 0.3 | 0.3 | 0.45 | 0.45 |
| $T_1$ | 14 | 14 | 70.9 | 70.9 |
| Number of Fibers | 12 | 8 | 12 | 8 |
| Fiber EA (kN) | 10.7 | 7.1 | 10.7 | 7.1 |
| Arannid EA Needed (kN) | 8.01 | 5.34 | 83.94 | 55.96 |
| Minimum aramid yarns and type needed to meet Aramid EA | 3 × 380 denier | 2 × 380 denier | 7 × 1420 denier | 5 × 1420 denier |

CABLE DESIGN EXAMPLES

Because the subunits shown in Table 1 are incorporated in a cable assembly, such as cable assembly 12, determination of the strength element EA needed in each subunit can be based on the various axial loads, represented by $T_2$ in FIG. 8, that cable assembly 12 may experience.

In general, cable 10 may be designed to keep the tensile load, $T_1$, on furcation legs 18 below the particular thresholds to ensure that the maximum spring force is not exceed and/or to ensure that the subunit compression remains within one or more of the ranges described above. In various embodiments, cable 10 is designed such that tensile loads, spring compression and/or compression limits are met while also allowing some of the axial load to reach optical fibers 30.

By way of example, the axial rigidity of the cable (cable EA) is the sum of the all the subunit EAs and the EAs of the outer tensile strength elements 32 (shown in FIG. 2), which in various embodiments may be aramid yarn strands and/or strength rods (e.g., GRP rods, metal wire, etc.). When subunits 16 are stranded in a helical stranding pattern, the load distributed along the subunit is given by Equation 6 below:

$$T_s = T_1 e^{\mu\theta} \qquad \text{Equation 6}$$

In Equation 6, $T_s$ is the maximum force along the subunit within the cable length to cause the maximum allowed compression of the subunit; $T_1$ is the tension experienced by the subunit sheath 28, specifically at the load where the maximum desired compression is reached, µ is coefficient of friction between the subunit jacket and the subunit tensile yarns and fibers, and θ is radial wrap length of the subunit, in radians. The radial wrap length is determined by dividing the critical cable length by the bend radius of the subunit. The bend radius of the subunit is determined by the stranding parameters of the cable as given by Equation 7 set forth below:

$$R = D'/2 + P^2/2\pi^2 D' \qquad \text{Equation 7}$$

In Equation 7, D' is the pitch circle diameter of the stranded units and P is pitch or lay length of the strand.

In theory, $T_s$ can increase exponentially forever, but in practice $T_s$ increases until it reaches the load limit for a completely coupled cable component. That limit is calculated as the Subunit EA divided by the Cable EA times the rated load. Experience has shown a critical cable length of 6 m through laboratory testing of various cable assemblies. In other words, if a 6 m cable assembly does not maximally compress the furcation legs at the rated cable load then neither will longer length cable assemblies. From this, one may conclude that if the subunit is completely coupled within 6 m of cable then the furcation legs will not buckle or become too wavy. This is expressed mathematically in Equation 8.

$$\frac{\text{Subunit } EA}{\text{Cable } EA} * \text{rated load} < T_s \qquad \text{Equation 8}$$

In Equation 8, $T_s$ is the value calculated at a 6 m cable length for a helically stranded subunit. The above calculations for $T_s$ refer to helically stranded subunits. If the subunits are SZ stranded, then there are sections of the stranding at the switchbacks where the subunits are parallel to the cable axis. This is usually accounted for by a 10% correction factor incorporated into the helix equations. Therefore, for an SZ stranded cables, $T_s$ would be the calculated for a 5.6 m cable length. For stranded subunits in fiber optic cables, the pitch circle diameter, D' is determined by the number of subunits and the subunit diameter. Subunits with a larger bend radius are more difficult to couple than subunits with a smaller bend radius. Therefore, the limiting cases are cables with a few subunits that have small diameters. The maximum lay lengths determined from the equations above for Subunit Designs 1 and 2 (shown in Table 1) in cables with three subunits that are SZ stranded were calculated for various levels of Cable EA based on different amounts and sizes of outer strength elements 32. The results are shown in Table 2, below. In a specific embodiment, Subunit Designs 1 and 2 are Corning's EDGE 2.0 and EDGE 8 subunit designs that incorporate the strength element designs discussed herein, and these were tested to validate the subunit designs discussed herein.

TABLE 2

| Outer Tensile Strength Elements | Subunit Design 1 | | Subunit Design 2 | |
| --- | --- | --- | --- | --- |
| | Cable EA (kN) | Maximum lay length (mm) | Cable EA (kN) | Maximum lay length (mm) |
| 18 × 1420 d | 312 | 260 | 330 | 247 |
| 12 × 1420 d | 263 | 248 | 257 | 228 |
| 10 × 1420 d | 241 | 232 | 233 | 222 |
| 4 × 1420 d | 141 | 207 | 159 | 201 |

In various embodiments, subunits 16 can include a wide variety of optical fibers including multi-mode fibers, single mode fibers, bend insensitive fibers, etc. In various embodiments, cable jacket 22 and subunit sheath 28 may be a variety of materials used in cable manufacturing, such as polyethylene, polyvinyl chloride (PVC), polyvinylidene difluoride (PVDF), nylon, polypropylene, polyester or polycarbonate and their copolymers. In addition, the material of cable jacket 22 and subunit sheath 28 may include quantities of other materials or fillers that provide different properties to cable jacket 22 and subunit sheath 28. For example, the material of cable jacket 22 may include materials that provide for coloring, UV/light blocking (e.g., carbon black), fire resistance, etc.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. In addition to the subunits 16 discussed above, optical transmission units as discussed herein may include optical fiber ribbons, tight-buffered optical fibers, optical fiber micromodules, etc.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical communication cable assembly comprising:
    an outer cable jacket;
    a first tensile strength element surrounded by the outer cable jacket;
    a plurality of optical transmission units surrounded by the outer cable jacket, each optical transmission unit comprising:
        an inner jacket defining a passage;
        a plurality of elongate optical transmission elements located within the passage; and
        a second tensile strength element located within the passage;
    a furcation unit, wherein the first tensile strength element and the inner jackets of each optical transmission units are coupled to the furcation unit, wherein the plurality of elongate optical transmission elements and the second tensile strength element extend through the furcation unit without being coupled to the furcation unit; and
    an optical connector coupled to an end of each of the plurality of optical transmission units, each optical connector comprising:
        a body coupled to the second tensile strength element of the optical transmission unit;
        a ferule coupled to the elongate optical transmission elements of the optical transmission unit; and
        a spring located between the ferule and the body, the spring has a spring force representative of the force needed to cause a maximum allowed compression of the spring;
    wherein the first tensile strength element is located outside of the inner jackets of the optical transmission units;
    wherein the cable assembly has a maximum rated cable load and wherein at the maximum rated cable load, the sum of axial forces experienced by the elongate optical transmission elements within each one of the optical transmission units is greater than 0.5 N and is less than the spring force.

2. The optical communication cable assembly of claim 1, wherein the optical transmission elements are optical fibers, wherein the second tensile strength element of each optical transmission unit has an axial rigidity and the optical fibers of each optical transmission unit together have an optical fiber axial rigidity, wherein the ratio of the axial rigidity of the second tensile strength element to the optical fiber axial rigidity of each optical transmission unit is such that, under axial loading at the maximum rated cable load, a decrease in length of a portion of at least one optical transmission unit between the furcation unit and the optical connector is between 0.1% and 2.5%.

3. The optical communication cable assembly of claim 2, wherein the axial rigidity of the second tensile strength element of each optical transmission unit is defined as the cross-sectional area of the second tensile strength element times the elastic modulus of the material of the second tensile strength element, wherein the optical fiber axial rigidity of each optical transmission unit is defined as the total cross-sectional area of the optical fibers of the optical transmission unit times the elastic modulus of the material of the optical fibers.

4. The optical communication cable assembly of claim 2, wherein, at the maximum rated cable load, the decrease in length of the portion of the optical transmission unit between the furcation unit and the optical connector is between 1 mm and 15 mm.

5. The optical communication cable assembly of claim 2, further wherein:
    the first tensile strength element has an axial rigidity;
    each optical transmission unit has an axial rigidity that is the sum of the axial rigidity of the second tensile strength element and the axial rigidity of the optical fibers;
    the cable assembly has a total axial rigidity that is the sum of the axial rigidity of all of the optical fibers, the axial rigidity of all of the second tensile strength elements and the axial rigidity of the first tensile strength element;

a ratio of the axial rigidity of one of the optical transmission units to the total axial rigidity of the cable assembly is such that, under axial loading at the maximum rated cable load, a decrease in length of the portion of all optical transmission units is between the furcation unit and the optical connector is between 0.1% and 2.5%.

6. The optical communication cable assembly of claim 1, wherein, within each optical transmission unit, a length of the second tensile strength element is substantially equal to a length of at least one of the elongate optical transmission elements.

7. The optical communication cable assembly of claim 1, wherein the second tensile strength element of each optical transmission unit comprises a plurality of tensile strength yarn strands.

8. The optical communication cable assembly of claim 7, wherein the spring force is greater than 5 newtons, wherein the tensile strength yarn strands are aramid yarn strands, wherein the plurality of elongate optical transmission elements of each optical transmission unit comprises at least eight optical fibers, further comprising at least three optical transmission units.

9. The optical communication cable assembly of claim 1, further comprising an adhesive material located within the furcation unit, the adhesive material bonding together and contacting the first tensile strength element, outer surfaces of the inner jackets of the plurality of optical transmission units and the furcation unit.

10. The optical communication cable assembly of claim 9, wherein the inner jacket of each optical transmission unit extends through the furcation unit, and further wherein an outer surface of the outer cable jacket defines an outermost surface of the cable assembly on an upstream side of the furcation unit and the outer surfaces of the inner jackets of the optical transmission units define outermost surfaces of the cable assembly on the downstream side of the furcation unit.

11. An optical communication cable assembly comprising:
    an outer cable jacket;
    a first tensile strength element surrounded by the outer cable jacket;
    a plurality of subunits surrounded by the outer cable jacket, each subunit comprising:
        an inner jacket defining a passage;
        a plurality of optical fibers located within the passage that together have an axial rigidity;
        a second tensile strength element located within the passage that has an axial rigidity;
    a coupling unit, wherein the outer cable jacket is received within a first end of the coupling unit such that the outer cable jacket terminates at the coupling unit, wherein each of the subunits extends out of a second end of the coupling unit, wherein the first tensile strength element and the inner jackets of each of the subunits are coupled to the coupling unit and the plurality of optical fibers and the second tensile strength element extend through the coupling unit without being coupled to the coupling unit;
    an optical connector coupled to an end of each of the subunits, each optical connector comprising:
        a body coupled to the second tensile strength element of the subunit;
        a ferule coupled to all of the optical fibers of the subunit; and
        a spring located between the ferule and the body, the spring has a spring force representative of the force needed to cause a maximum compression of the spring;
    wherein the first tensile strength element is located outside of the inner jackets of the subunits;
    wherein each subunit has a subunit end portion located between the coupling unit and the optical connector coupled to the subunit, the subunit end portion has an initial length measured between the coupling unit and the optical connector;
    wherein, under axial loading of the cable assembly applied at the coupling unit, each subunit experiences a portion of the axial load resulting in compression of the subunit end portion, and further wherein both the optical fibers and the second tensile strength element experience some of the portion of the axial loading of the subunit;
    wherein a ratio of the axial rigidity of the second tensile strength element to the axial rigidity of the optical fibers of each subunit is such that, when a decrease in length of the subunit end portion under the axial loading is between 0.1% and 2.5%, the portion of the axial load experienced by the optical fibers of the subunit is greater than zero and is less than the spring force.

12. The optical communication cable assembly of claim 11, wherein the portion of the axial load experienced by the optical fibers of the subunit is greater than 0.5 newtons and is less than the spring force.

13. The optical communication cable assembly of claim 12, wherein the spring force is greater than 5 newtons.

14. The optical communication cable assembly of claim 12, wherein the cable assembly has a maximum rated cable load, wherein at the maximum rated cable load the decrease in length of the subunit end portion is between 0.1% and 2.5%.

15. The optical communication cable assembly of claim 11, wherein, when a decrease in length of the subunit end portion under the axial loading is between 1 mm and 15 mm, the portion of axial load experienced by the optical fibers of the subunit is greater than zero and is less than the spring force.

16. The optical communication cable assembly of claim 11, wherein the axial rigidity of the second tensile strength element of each optical transmission unit is defined as the cross-sectional area of the second tensile strength element times the elastic modulus of the material of the second tensile strength element, wherein the axial rigidity of the optical fibers of each subunit is defined as the total cross-sectional area of the optical fibers of the subunit times the elastic modulus of the material of the optical fibers.

17. The optical communication cable assembly of claim 11, wherein, within each subunit, a length of the second tensile strength element is substantially equal to a length of at least one of the optical fibers.

18. An optical communication cable assembly comprising:
    an outer cable jacket;
    a first tensile strength element surrounded by the outer cable jacket that has an axial rigidity;
    a plurality of subunits surrounded by the outer cable jacket, each subunit comprising:
        an inner jacket defining a passage;
        a plurality of optical fibers located within the passage;

a second tensile strength element located within the passage;

wherein each subunit has an axial rigidity;

a furcation unit, wherein the first tensile strength element and the inner jackets of each subunit are coupled to the furcation unit, wherein the plurality of optical fibers and the second tensile strength element of each subunit extend through the furcation unit without being coupled to the furcation unit; and an optical connector coupled to an end of each of the subunits, each optical connector comprising:

a body coupled to the second tensile strength element of the subunit; and a ferule coupled to all of the optical fibers of the subunit; and wherein the cable assembly has a maximum rated cable load and a total axial rigidity that is the sum of the axial rigidities of all of the optical fibers of all of the subunits, of the second strength elements of all of the subunits and of the first tensile strength element;

wherein, under axial loading applied at the furcation unit, each subunit experiences a portion of the axial load that causes compression of a portion of the subunit located between the furcation unit and the optical connector, the compression is relative to the amount of axial loading, further wherein both the optical fibers and the second tensile strength element experience some of the portion of the axial loading of the subunit;

wherein a ratio of the axial rigidity of the subunits to the total axial rigidity of the cable assembly is such that compression of each subunit is between 0.1% and 2.5% of an initial length of the portion of the subunit between the furcation unit and the optical connector at the maximum rated cable load.

19. The optical communication cable assembly of claim 18, wherein each optical connector further comprises a spring located between the ferule and the body, the spring has a spring force representative of the force needed to cause a maximum compression of the spring, wherein at the maximum rated cable load the axial force experienced by the optical fibers of a subunit is greater than zero and is less than the spring force.

20. The optical communication cable assembly of claim 18, wherein axial rigidity is defined as the cross-sectional area of a cable component times the elastic modulus of the material forming the cable component, wherein, within each subunit, a length of the second tensile strength strand is substantially equal to a length of each of the optical fibers of the subunit.

* * * * *